US011221810B2

(12) United States Patent
Yamada

(10) Patent No.: US 11,221,810 B2
(45) Date of Patent: Jan. 11, 2022

(54) NON-TRANSITORY COMPUTER-READABLE RECORDING MEDIUM, INFORMATION PROCESSING APPARATUS AND PRINTING METHOD

(71) Applicant: BROTHER KOGYO KABUSHIKI KAISHA, Nagoya (JP)

(72) Inventor: Kazutaka Yamada, Nagakute (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/693,496

(22) Filed: Nov. 25, 2019

(65) Prior Publication Data

US 2020/0174724 A1 Jun. 4, 2020

(30) Foreign Application Priority Data

Nov. 30, 2018 (JP) .............................. JP2018-224993

(51) Int. Cl.
*G06F 3/12* (2006.01)

(52) U.S. Cl.
CPC .......... *G06F 3/1239* (2013.01); *G06F 3/1218* (2013.01)

(58) Field of Classification Search
CPC .............................. G06F 3/1239; G06F 3/1218
USPC ....................................... 358/1.14, 1.15, 1.9
See application file for complete search history.

(56) References Cited

U.S. PATENT DOCUMENTS

| 2010/0302573 | A1* | 12/2010 | Hakozaki | .............. | G06F 3/1238 |
| | | | | | 358/1.14 |
| 2012/0268781 | A1 | 10/2012 | Kajihara | | |
| 2013/0321860 | A1 | 12/2013 | Koshigaya | | |
| 2015/0248260 | A1* | 9/2015 | Kanno | .................. | G06F 3/1287 |
| | | | | | 358/1.15 |
| 2015/0277827 | A1 | 10/2015 | Oonami | | |
| 2017/0223210 | A1 | 8/2017 | Yamada | | |
| 2018/0300092 | A1 | 10/2018 | Sakai | | |

FOREIGN PATENT DOCUMENTS

| JP | 2005182486 | A | 7/2005 |
| JP | 2012226639 | A | 11/2012 |
| JP | 2013250785 | A | 12/2013 |
| JP | 2015191645 | A | 11/2015 |
| JP | 2017-134718 | A | 8/2017 |
| JP | 2018176598 | A | 11/2018 |

OTHER PUBLICATIONS

International Search Report and Written Opinion dated Jan. 28, 2020 from PCT/JP2019/045948.

* cited by examiner

*Primary Examiner* — Quang N Vo
(74) *Attorney, Agent, or Firm* — Scully, Scott, Murphy & Presser, PC

(57) ABSTRACT

A supporting program according to aspects of the present disclosures can be executed by a CPU of a PC and corresponds to a printer connected to the PC. When the CPU receives, through a general-use printing program implemented in the OS of the PC in advance, a print instruction to cause the printer to perform printing, the supporting program executes a restricting process of restricting printing based on the print instruction.

20 Claims, 7 Drawing Sheets

NON-TRANSITORY COMPUTER-READABLE RECORDING MEDIUM, INFORMATION PROCESSING APPARATUS AND PRINTING METHOD

CROSS-REFERENCE TO RELATED APPLICATIONS

This application claims priority under 35 U.S.C. § 119 from Japanese Patent Application No. 2018-224993 filed on Nov. 30, 2018. The entire subject matter of the application is incorporated herein by reference.

BACKGROUND

Technical Field

The technical field disclosed in the present specification relates to a non-transitory computer-readable recording medium containing instructions realizing a supporting program which supports control of a printer, an information processing apparatus and a printing method.

Related Art

As a technique to control a printer from an information processing apparatus such as a personal computer (hereinafter, abbreviated as a "PC"), a configuration of installing a printer driver in the information processing apparatus, generating print data using the printer driver and transmitting the print data has been widely known.

SUMMARY

Recently, a technique of controlling a printer using a printing program which is standardly implemented in an operating system (OS), without using the above-mentioned printer driver, has been in practical use. According to such a technique, when the OS detects a printer, the OS associates the detected printer with the OS-standard printing program. Thereafter, it becomes possible that, when a print instruction corresponding to the printer is received, printing is performed using the OS-standard printing program, without using the printer driver.

However, by the printing using the OS-standard printing program, all the functions realized by the printer driver may not be realized. Therefore, when a user has changed a route of printing from the printer driver to the OS-standard printing program, some of the functions may not be realized. As a result, for example, it is possible that an unexpected printing may be performed.

The present specification discloses a technique of suppressing the unexpected printing by the information processing apparatus in which an OS-standard printing program is implemented.

According to aspects of the present disclosure, there is provided a non-transitory computer-readable recording medium for an information processing apparatus. The information processing apparatus has a controller, and the recording medium contains computer-executable instructions. The instructions realizes a supporting program executable by a computer of the information processing apparatus and corresponding to the printer connected to the information processing apparatus. The supporting program causes, when executed by the controller, the information processing apparatus to perform a restricting process when a print instruction is received through a printing program. The restricting process is a process of restricting printing based on the print instruction. The printing program is a program implemented in an operating system of the information processing apparatus. The print instruction being an instruction to cause a printer connected to the information processing apparatus to perform printing.

BRIEF DESCRIPTION OF THE ACCOMPANYING DRAWINGS

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
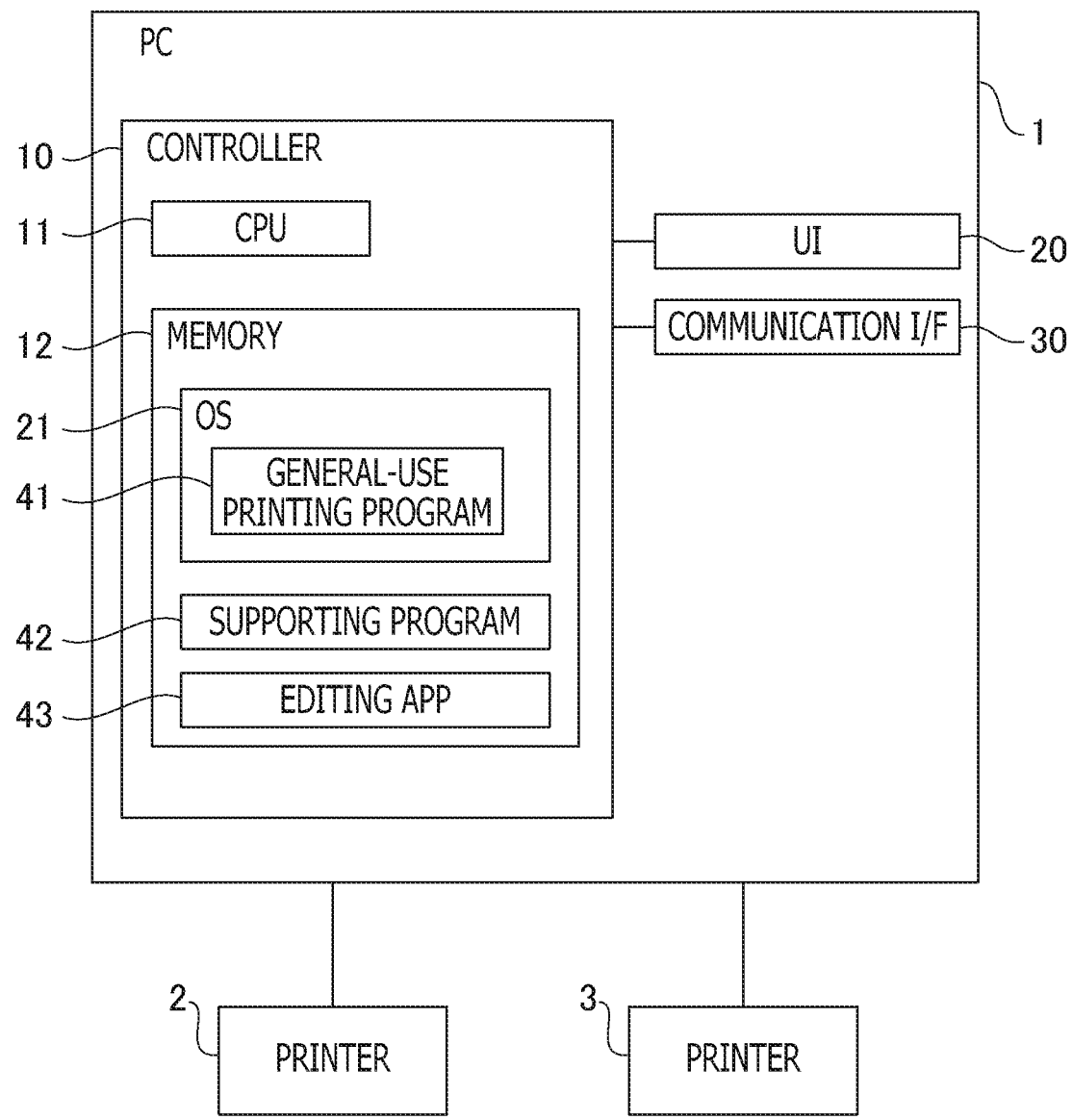
FIG. 1 is a block diagram showing an electrical configuration of a printing system.

An example of a configuration of a print system in which programs according to the embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard or a mouse having an input receiving function.

The communication I/F 30 includes hardware for communicating with the printer 2 and a hardware for accessing the Internet. The communication I/F 30 may include multiple interfaces respectively employing different communication methods. Examples of the communication methods may include the network communication, a USB communication and the like.

The controller 10 includes a CPU 11 and a memory 12. The CPU 11 is an example of a computer. The memory 12 includes a ROM, a RAM and a non-volatile memory and stores various application programs (hereinafter, referred to as "APP's") and various pieces of data. According to the present specification, the details of the memory will not be distinguished from each other. The CPU 11 performs various processes in accordance with programs retrieved from the memory 12 or in accordance with user's instructions. It should be noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It should be noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

The general-use printing program 41 is an APP to cause a printer (various printers such as the printer 2) to perform printing from the PC 1. The general-use printing program 41 is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various device venders. The general-use printing program 41 is configured to cause any of the plurality of models of printers to perform operations which are commonly implemented in the plurality of models of printers. Alternatively, the general-use printing program 41 may be a program supplied from the device venders to a vender of the OS 21 so that the general-use printing program 41 is implemented in the OS 21 (e.g., a kind of printer driver supplied by a device vender to be implemented in the OS 21).

Programs developed by respective venders of the devices after the general-use printing program 41 to be implemented in the OS 21 has been supplied to the vender of the OS 21 can be added to the PC 1 by installing the same. In the following description, printer drivers which can be added to the PC 1 by installation (i.e., not the program which has been implemented in the OS 21 in advance) will be simply referred to as the "printer drivers" or "vender drivers." In other words, the "printer driver" is not the program which has been implemented in the OS 21 in advance but a program which needs to be installed in the OS 21 according to a particular process in order to user the same. For example, an installer designated through the UI 20 or the OS 21 installs the printer driver in the OS 21. The printer drivers are prepared by the venders of the printers so as to correspond to respective models of the printers. Thus, a printer driver corresponding to a particular printer may be configured to receive instructions to perform functions which are intrinsic to the particular printer.

There may be a case where the printer driver, or the vender driver exhibits a higher performance than the general-use printing program 41 implemented in the OS 21 in advance. To have the higher performance may include, for example, that the print data generated by the printer driver is processed more efficiently by the printer than the print data generated by the general-use printing program 41, and thus, a printing speed of the print data generated by the printer driver is faster than the printing speed of the image data generated by the general-use printing program 41. Optionally or alternatively, to have the higher performance may include, for example, that the print data generated by the printer driver is processed with use of less memory amount. Further, an example of the higher performance may include that the print data generated by the printer driver causes the printer to print a printed matter having a better color developing property than the print data generated by the general-use printing program 41. Further, an example of the higher performance may mean that the print data generated by the printer driver causes the printer to print a printed matter having a higher printing resolution than the print data generated by the general-use printing program 41. Further, an example of the higher performance may mean that the printer driver instructs the printer to perform a function intrinsic to the printer which cannot be instructed by the general-use printing program 41. In this case, the function intrinsic to the printer may include, for example, a mirror-reversed printing function and a black/white inversion printing function.

The supporting program 42 is a program which performs processes based on the instruction by the OS 21 in association with the startup of the general-use printing program 41 and supports controlling of hardware subjected to the instruction. The supporting program 42 is started, for example, by the OS 21. The supporting program 42 is an APP corresponding to a model of the printer 2, which is subjected to be controlled. Typically, the supporting program 42 is prepared by the vender of the device (e.g., the printer) subjected to be controlled. Generally, the vender of the device registers the supporting program 42 with a platform supplied by the vender of the OS 21 in accordance with a procedure designated by the vender of the OS 21. When a printer 2 is newly connected to the PC 1 and the supporting program corresponding to the printer 2 is registered with the platform, the OS 21 downloads the supporting program 42 from a sever in which the supporting program 42 is stored and incorporates the same in the PC 1. According to the present embodiment, the supporting program 42 used in the printer 2 is the same APP used in the printer 3.

The OS 21 associates identification information of the incorporated supporting program 42 with the printer information of the connected printer 2 and stores the same in the memory 12. In the PC 1 to which a plurality of modes of printers are connected, a plurality of supporting programs respectively corresponding to the plurality of models are incorporated, and information associating the plurality of printers with the plurality of supporting programs is stored in the memory 12. That is, in the memory 12, as the printer information for each of the printers connected to the PC 1, information on the corresponding supporting program 42 is stored in addition to the model information and the access information of each printer.

The editing APP is, for example, an APP for generating and/or editing image data and document data. Examples of the editing APP 43 are Microsoft Word® and Power Point®. The editing APP 43 is configured to receive a user operation including an instruction to cause the printer 2 to perform a particular operation. The editing APP 43 is configured to receive a print instruction which causes the printer 2 to perform printing through the UI 20.

Figure 2:
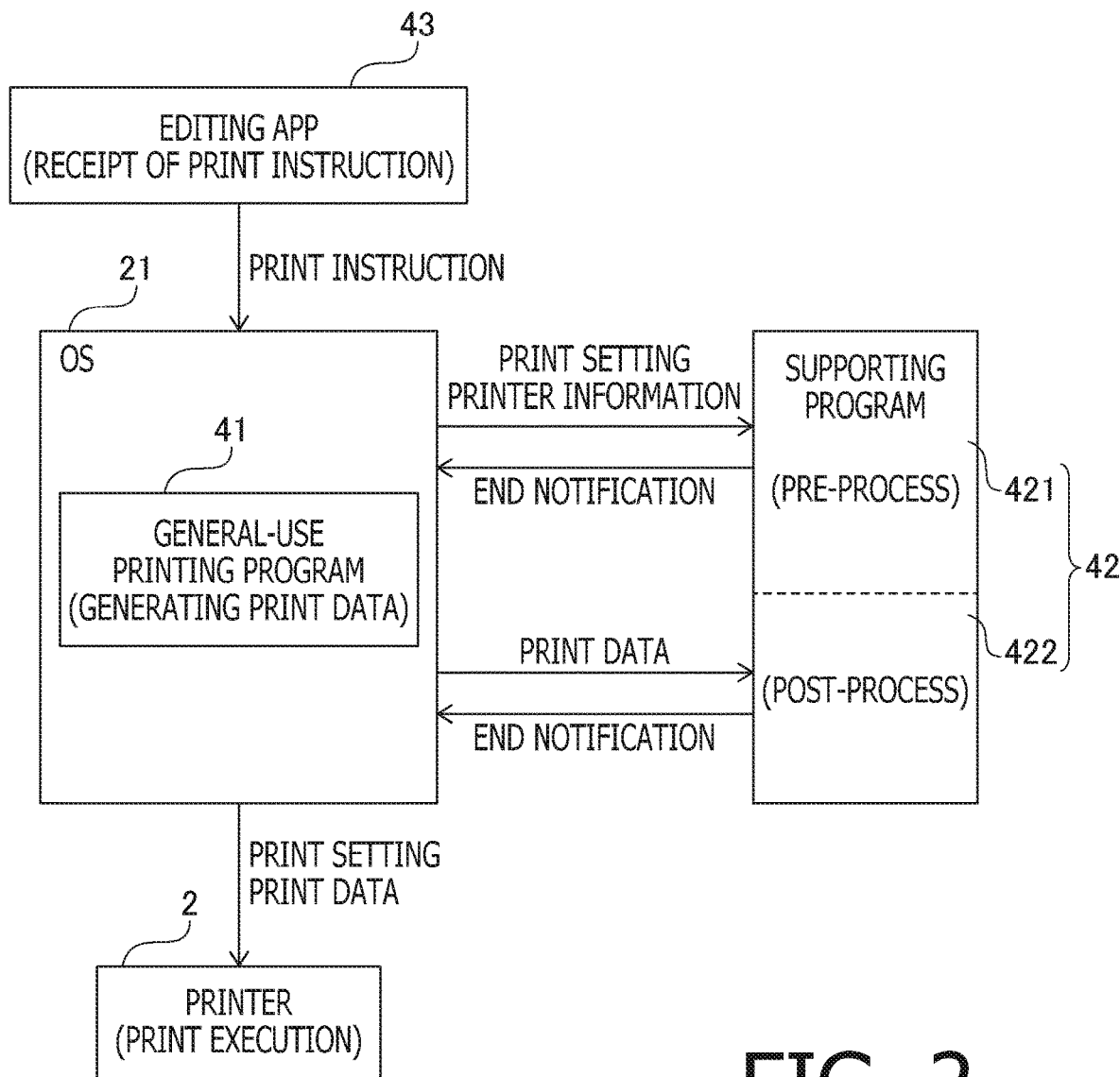
FIG. 2 is a drawing illustrating an order of processes realized by respective programs.

Next, an order of processes performed by respective programs will be described, referring to FIG. 2. In the following description, a case where the PC 1 receives, by the editing APP 43 through the UI 20, an instruction to designate image data subjected to print and an instruction to perform printing with the printer 2 through the general-use printing program 41 will be described.

The editing APP 43, which has received the print instruction, transmits a print execution notification to OS 21 based on the received print instruction. The print execution notification contains, for example, information indicating the printer designated by the print instruction, print parameter, print settings and information indicating the image data designated by the print instruction. Next, when the supporting program 42 corresponding to the printer 2, which is the printer designated by the print instruction, is stored in the memory 12, the OS 21 instructs the supporting program 42 to perform the process by the supporting program 42 before generation of the print data by the general-use printing program 41.

The supporting program 42 includes a pre-process to be performed before the process by the general-use printing program 41 is started and a post-process to be performed after the process by the general-use printing program 41 is finished and before the print data is transmitted to the printer 2. In the following description, a part of the process among the processes of the supporting program 42 and performed before the process of the general-use printing program 41 is started will be described as a process of a "pre-process supporting program 421" and a part of the process among the processes of the supporting program 42 and performed after the process by the general-use printing program 41 is finished will be described as a process of a "post-process supporting program 422."

In the PC 1 according to the present embodiment, in response to receipt of the print instruction, the process of the pre-process supporting program 421 is performed before the print data is generated by the general-use printing program 41. The pre-process supporting program 421 is configured to obtain various pieces of information contained in the print instruction (e.g., information indicating the print setting, information indicating the printer, information indicating a user who has instructed to execute a print job and the like) from the OS 21. The pre-process supporting program 421 performs the pre-process based on the obtained information and the pre-process supporting program 421 itself and returns an end notification to the OS 21 after the process is finished. Details of the pre-process by the pre-process supporting program 421 will be described later.

When the end notification is received from the pre-process supporting program 421, the OS 21 performs a process based on the general-use printing program 41. The general-use printing program 41 generates the print data from the image data, in accordance with the print instruction.

When the print data has been generated, the OS 21 instructs the post-process supporting program 422 to execute the post-process before transmitting the generated print data to the printer 2. The post-process supporting program 422 is configured to obtain not only information regarding the print setting and the printer but also the print data which has already been generated from the OS 21. The post-process supporting program 422 performs the post process based on the obtained information and the post-process supporting program 422 itself and returns the end notification to the OS 21 after the process is finished. Details of the post process based on the post-process supporting program 422 will be described later.

When the OS 21 receives the end notification from the post-process supporting program 422, the OS 21 transmits the print setting and the print data to the printer 2 through the communication I/F 30. It is noted that there may be a case where the print setting set by the editing APP 43 is changed by the pre-process supporting program 421 or the post-process supporting program 422. The printer 2 performs printing based on the received print setting and the print data.

Next, a printing procedure including processes based on the supporting programs 42 will be generally described with reference to a sequential chart shown in FIG. 3. Firstly, the editing APP 43 receives, through the UI 20, designation of the image data subjected to be printed and an instruction to perform printing (arrow A). Then, the editing APP 43 delivers the print execution notification indicating contents of received instruction to the OS 21 (arrow B).

When detecting the print execution notification output by the editing APP 32, the OS 21 identifies a printer designated as a printer to be controlled to perform printing based on the information contained in the print execution notification. For example, when printing with use of the printer 2 in accordance with the general-use printing program 41 is designated, if the supporting program 42 corresponding to the printer 2 has been implemented in the general-use printing program 41, the OS 21 outputs an execution command of the supporting program 42. In response to the OS 21 detecting the print execution notification, the execution command is output to the supporting program 42. Thus, outputting of the execution command by the OS 21 is an example of a detection notification to notify that the print instruction is detected.

When the execution command of the supporting program 42 is output from the OS 21, the supporting program 42 executes a process based on the pre-process supporting program 421 or the post-process supporting program 422. In the example shown in FIG. 3, before the general-use printing program 41 starts generating the print data, the OS 21 outputs the execution command to the supporting program 42 and starts a process based on the pre-process supporting program 421 (arrow C).

The pre-process supporting program 421 according to the present embodiment determines, based on the information received from the OS 21, whether a restriction condition to restrict printing is satisfied (arrow D). The PC 1 stores the restriction conditions for respective users in the memory 12, and the pre-process supporting program 421 retrieves the restriction condition from the memory 12 and makes the determination at arrow D.

Figure 4:
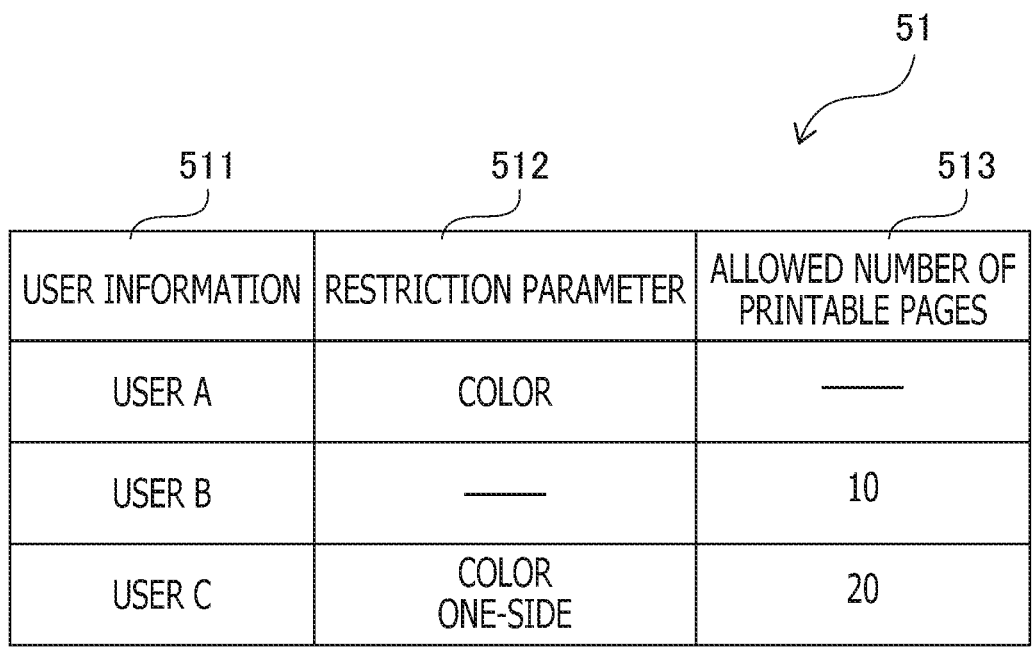
FIG. 4 is a drawing illustrating an example of restriction information.

An example of the restriction condition is shown in FIG. 4. The PC 1 stores restriction information 51 which is information containing restriction conditions for respective users in the memory 12. In the restriction information 51, for example, a restriction parameter 512 and the allowed number of printable pages 513 are stored in association with user information 511 which is identifying information of each user.

The restriction parameter 512 is the print parameter to be restricted. For example, the restriction parameter 512 indicates restriction of a color printing, restriction of a one-side printing or restriction of the aggregation printing, restriction of printing without watermarks and the like. In the example shown in FIG. 4, the color printing by user A is restricted. According to further embodiments, depending on a user, only a monochromatic printing, a both-side printing and an N-up (i.e., an N-in-1) printing may be allowed. Further, the allowed number of printable pages 513 is, for example, the maximum number of printable pages for one print job. It is further noted that the restriction condition 51 may further include information based on a data size of the print data, restriction of printing when the printer is not operating in a toner-saving mode. It is noted that the restriction information 51 may further include the printer information. That is, even if the user is the same, different restriction conditions may be set for respective printers. Further, the restriction information 51 may be information storing conditions to be restricted, or information storing conditions not to be restricted.

The restriction information 51 is, for example, set by an administrator of the print system in advance, and is stored in the memory 12. When, for example, the printer drivers of the printer 2 and printer 3 are implemented in the OS 21 of the PC 1, there is a case where the function of the printer driver has a print restriction function to set the restriction condition for printing. The administrator of the print system may generate the restriction information 51 using such a print restriction function of the printer driver. In such a case, the restriction information 51 may be stored in a storage area from which both the printer driver and the supporting program 42 can retrieve the same.

The restriction information 51 may be stored in a server or the like, which is communicatable with the PC 1, or stored in the memory of the printer 2 or printer 3. When the restriction information 51 is stored in the printer, restriction parameters and/or the allowable numbers of printable pages for respective users, with respect to the printer, are stored in the restriction information 51. When the restriction information 51 is not stored in the memory 12, the supporting program 42 may obtain the restriction information 51 from the printer designated as a device which is caused in the print job to perform printing, and determine whether restriction is effected based on the obtained restriction information 51. When the restriction information 51 is stored in the server or printer, the administrator of the print system can easily manage the restriction information 51. In contract, when the restriction information 51 is stored in the memory 12 of the PC 1, the user of the PC 1 can generate an allowable print job referring to the restriction information 51.

Returning to FIG. 3, when it is determined, at arrow D, that the restriction condition is satisfied and the OS 21 is compliant to a cancel instruction which is an instruction the OS 21 cancels printing, the supporting program 421 outputs a cancel instruction to the OS 21 to make the OS 21 cancel the print job (arrow E). The cancel instruction is an instruction to cancel a process of the print job based on the print execution notification received at arrow B. When the OS 21 is compliant to the cancel instruction, the process is terminated at arrow E, and the process after arrow F in FIG. 3 will not be performed. Incidentally, when the process of the print job is canceled, the pre-process supporting program 421 may display a message notifying cancellation on the UI 20.

When the OS 21 cannot execute a process corresponding to the cancel instruction, the pre-process supporting program 421 adds restriction existing information to the print parameter (arrow F) instead of outputting of the cancel instruction, and notifies end of process to the OS 21 (arrow G).

In response to the OS 21 receiving the end notification from the pre-process supporting program 421, the OS 21 generates the print data using the general-use printing program 41 (arrow H). The print data generated with use of the general-use printing program 41 is general-use print data, which can be used by various types of printer for printing.

After generating the print data with use of the general-use printing program 41, the OS 21 outputs the execution command of the process according to the supporting program 42 again (arrow I). Then, the supporting program 42 starts a process according to the pre-process supporting program 422.

The post-process supporting program 422 determines whether the restriction existing information is included in the print parameter (arrow J). When it is determined that the restriction existing information is included in the print parameter, the post-process supporting program 422 executes a process of restricting execution of printing. For example, the post-process supporting program 422 rewrites the transmission destination information of the print job so that the print data is transmitted to a port to which no device is connected (arrow K). Then, the post-process supporting program 422 notifies the OS 21 of end of process (arrow L).

In response to the OS 21 receiving the end notification from the post-process supporting program 422, the OS 21 transmits the print data (arrow M). The transmission destination of the print data transmitted from the OS 21 is the port to which no device is connected (i.e., a free port), and the print data will not be transmitted to the printer 2 or the printer 3. Accordingly, printing based on the print data will not be performed.

According to the present embodiment, even if the OS 21 cannot execute a process corresponding to the cancel instruction, since the transmission destination of the print data in which the restriction existing information is included is changed to a free port, execution of printing is prevented.

It is noted that when the pre-process supporting program 421 determines, at arrow D, that the restriction condition is not satisfied, the pre-process supporting program 421 notifies the end of process to the OS 21 (arrow G) without adding the restriction existing information to the print parameter. Accordingly, it is determined that the restriction existing information is not contained in the print parameter at arrow J, and the post-process supporting program 422 does not change the transmission destination of the print data. Accordingly, the print data generated with use of the general-use printing program 41 is transmitted to the printer 2 designated by the print instruction, and the printer 2 performs printing according to the received print data.

Next, referring to a flowchart shown in FIG. 5, the printing process realizing an operation of the print system according to the present embodiment will be described. The printing process is executed by the CPU 11 of the PC 1 under control of the OS 21, in response to the editing APP 43 receiving the print instruction to cause the printer 2 to perform printing with use of the general-use printing program 41 (arrow A of FIG. 3) and the OS 21 receiving the print execution notification from the editing APP 43 (arrow B of FIG. 3). According to the present embodiment, a procedure when the OS 21 is not compliant to the cancel instruction will be described.

In the printing process, the OS 21 initially determines whether the supporting program 42 is stored in the memory 12 (S101). As mentioned above, regarding the supporting programs 42, ones compliant to respective printers are prepared by the venders of the respective devices, and when the OS 21 detects the printer, the corresponding supporting program 42 is installed in the PC 1. When it is determined that the supporting program 42 is not installed in the PC 1 (e.g., when the supporting program 42 compliant to the printer 2 has not been prepared) (S101: NO), the OS 21 generates the print data with use of the general-use printing program 41 implemented in the OS 21 (S102).

The OS 21 transmits the print data generated in S102 to the printer 2 (S103), and terminates the printing process. The printer 2 performs printing according to the print data received from the PC 1. It is noted that when the PC 1 fails to transmit the print data, the PC 1 preferably executes a particular error process.

When the supporting program 42 is not installed in the PC 1, the print data is generated with use of the general-use printing program 41. Therefore, the user can use various models of printers 2 in a manner the same as a case where the supporting program 42 is used, without being conscious of a setup of the printer 2. It is noted, however, that, when printing is performed with use of the general-use printing program 41, a relatively longer time may be required and/or quality of printed matter may be lowered in comparison with printing with use of a high-performance printer driver (i.e., the vender driver).

When it is determined that the supporting program 42 is installed in the PC 1 (S101: YES), the OS 21 outputs the execution command to the supporting program 42 corresponding to the printer 2 so that the process according to the supporting program 42 is started (S105, arrow C of FIG. 3). Then, the CPU 11 performs the pre-process according to the pre-process supporting program 421. For example, the OS 21 may input information indicating the pre-process supporting program 421 in the supporting program 42. Alternatively, the OS 21 stores the information indicating the pre-process supporting program 421 in the memory 12 and then outputs the execution command to the supporting program 42, and the supporting program 42 may retrieve the stored information. Further alternatively, the OS 21 may output the execution command designating a process of the pre-process supporting program 421.

Figure 6:
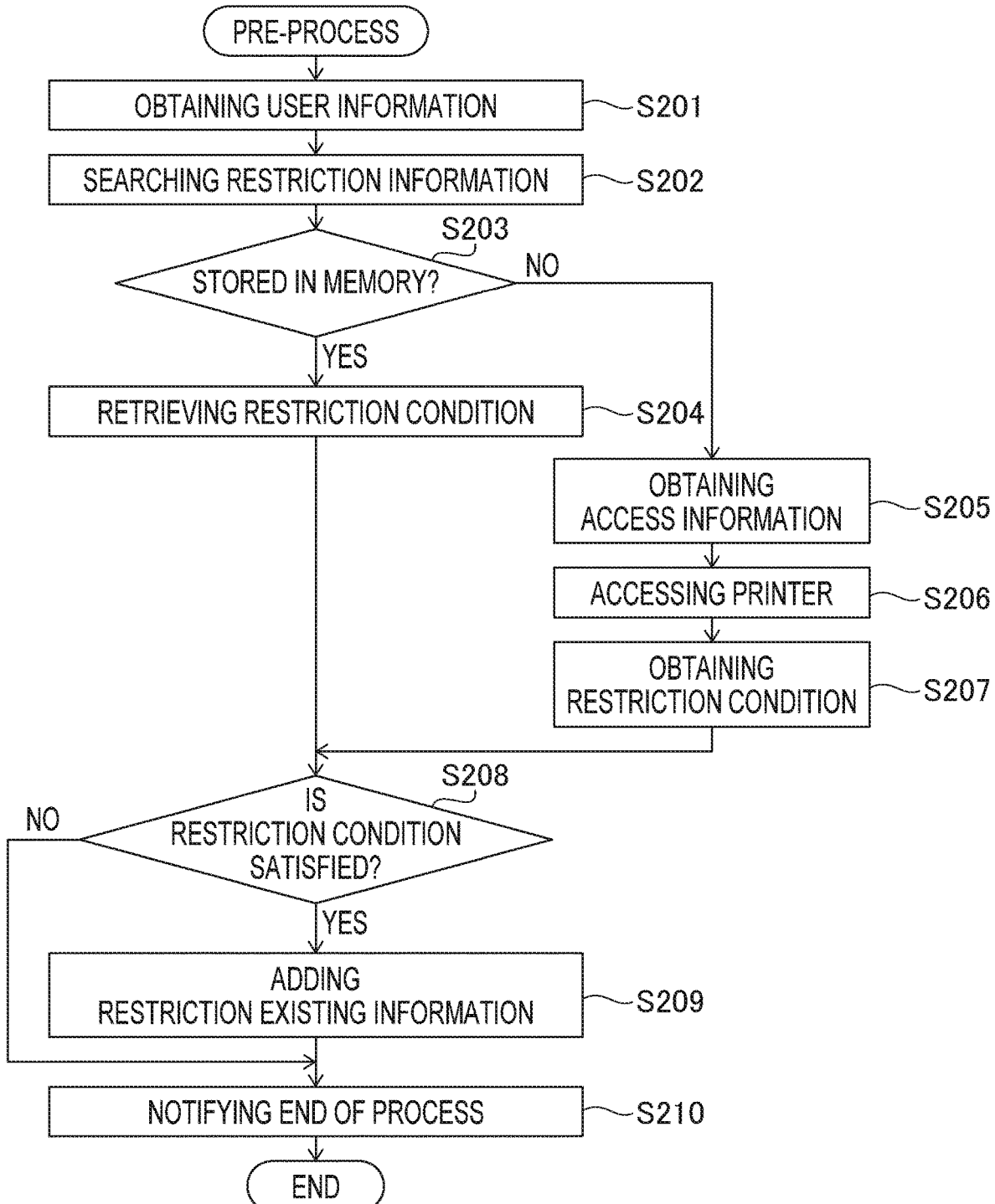
FIG. 6 is a flowchart illustrating a pre-process.

Referring to a flowchart shown in FIG. 6, the pre-process will be described. In the pre-process, the supporting program 42 obtains user information of a user who instructed execution of printing from the OS 21 based on the print job designated by the print instruction (S201). The OS 21 delivers various pieces of information set by the print instruction to the pre-process supporting program 42, for example, when the pre-process supporting program 421 is started up. The information as delivered includes, for example, the model information and access information of the printer which performs printing, various types of print parameters included in the print instruction and user information of the print job.

Next, the supporting program 42 detects the restriction information 51 (S202). As shown in FIG. 4, the restriction information 51 is information regarding the restriction conditions for respective users. The supporting program 52 determines whether the restriction information 51 is stored in the memory 12 (S203). When it is determined that the restriction information is stored in the memory 12 (S203: YES), the supporting program 42 retrieves the restriction condition which is stored in association with the user of the user information obtained in S201 from the restriction information 51 (S204). Step S204 is an example of a second restriction information obtaining process.

When it is determined that the restriction information 51 is not stored in the memory 12 (S203: NO), the supporting program 42 obtains the access information of the printer 2 which is a printer designated as the device caused to perform printing (S205). Step S205 is an example of an access information obtaining process. The access information is, for example, an IP address. Then, the supporting program 42 accesses the printer 2 based on the access information (S206), and obtains the restriction information 51 stored in the printer 2 (S207). Step S207 is an example of a first restriction information obtaining process.

Figure 3:
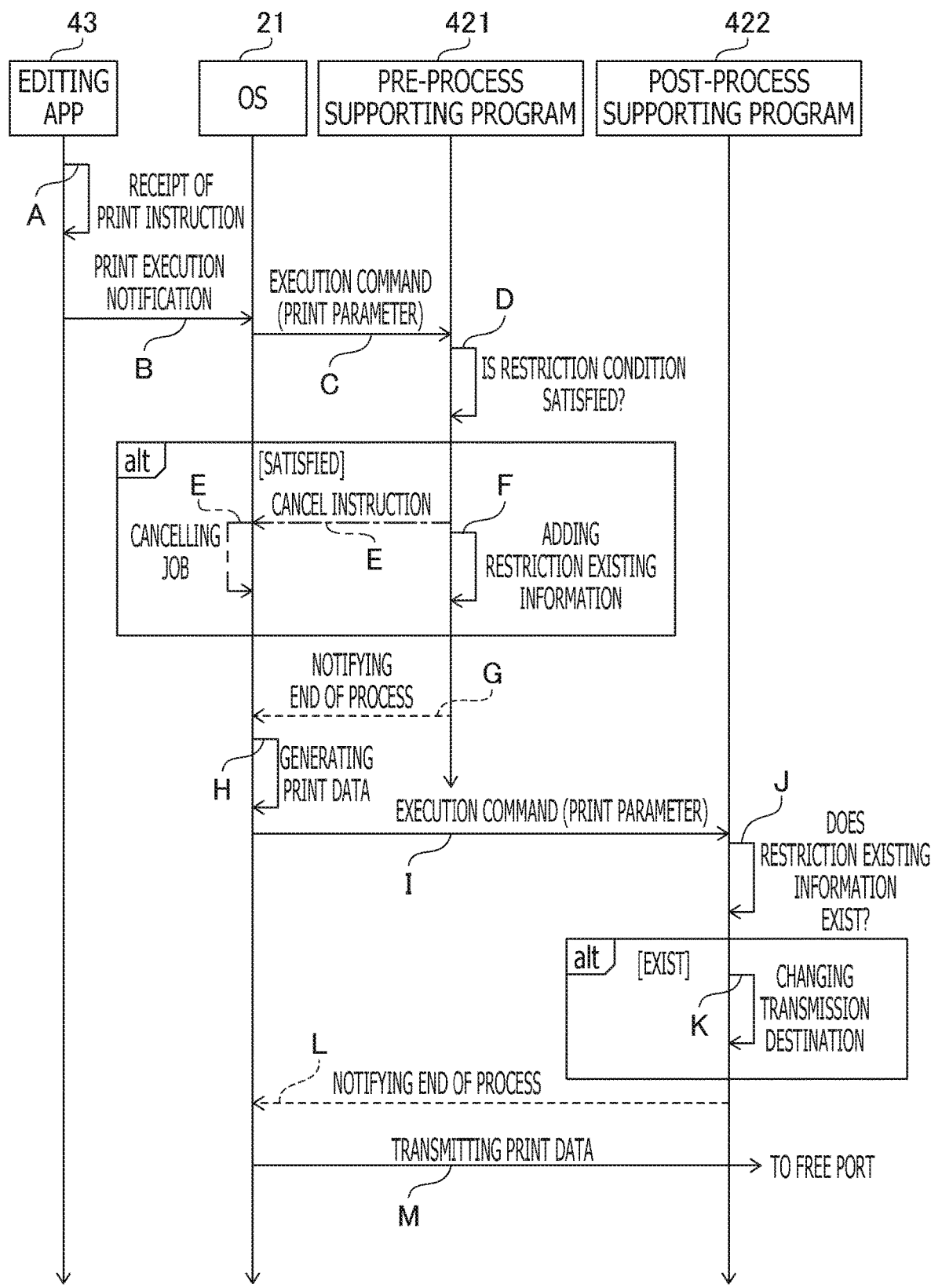
FIG. 3 is a sequential chart showing an example of operations of respective programs.

The supporting program 42 determines whether the restriction condition regarding restriction of printing is satisfied based on the restriction information 51 retrieved from the memory 12 or the memory of the printer and the print parameter of the print job (S208, arrow D in FIG. 3). When it is determined that the restriction condition is satisfied (S208: YES), the supporting program 42 adds, to the print parameter, the restriction existing information indicating that the restriction condition is satisfied (S209, arrow F in FIG. 3). After execution of S209 or when it is determined that the restriction condition is not satisfied (S208: NO), the supporting program 42 notifies end of pre-process (S210, arrow G in FIG. 3) and terminates the pre-process. The end notification is delivered from the pre-process supporting program 421 to the OS 21.

Figure 5:
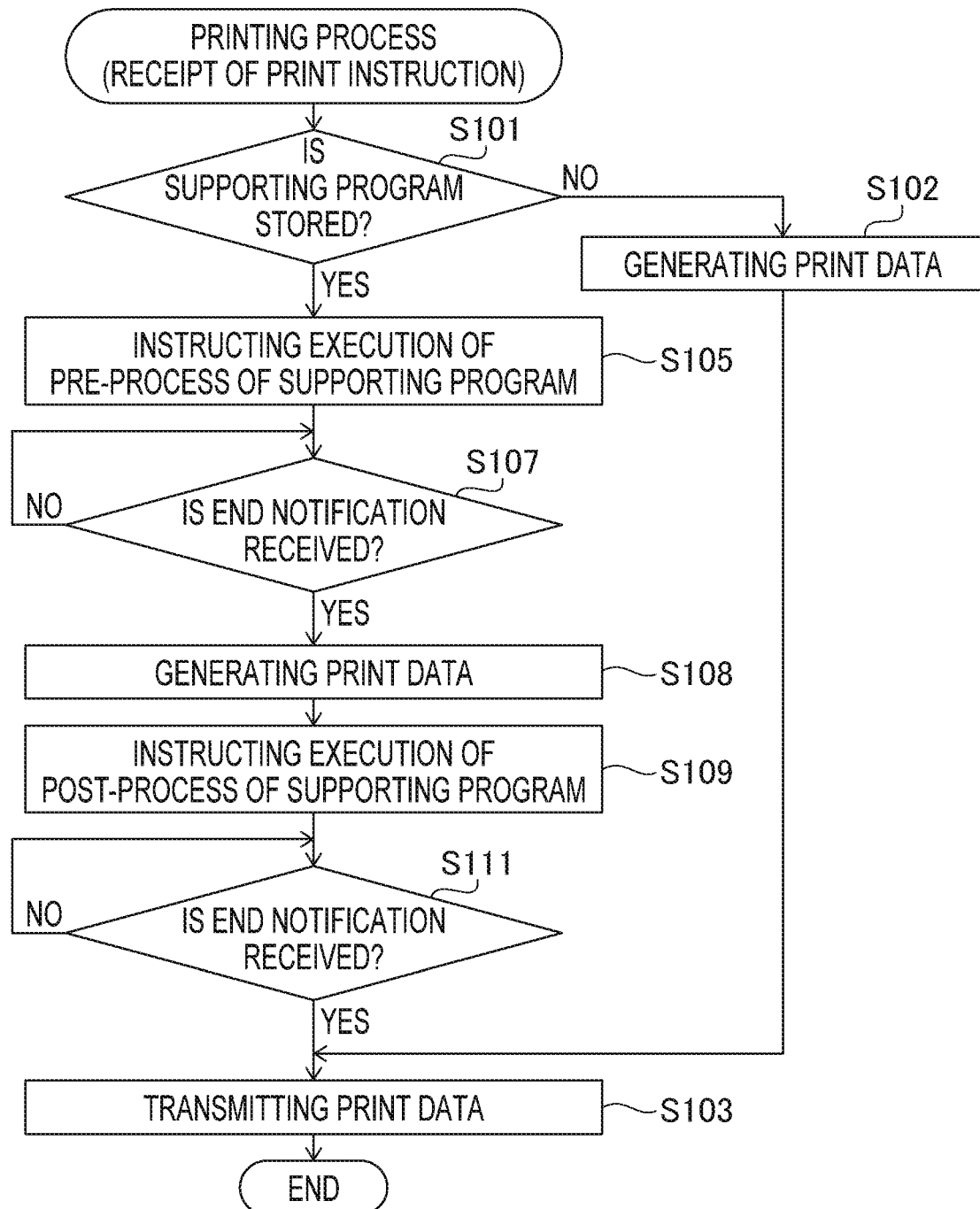
FIG. 5 is a flowchart illustrating a printing process.

Returning to the printing process shown in FIG. 5, the OS 21 determines whether the end notification is received from the pre-process supporting program 421 (S107). When the pre-process is terminated, the OS 21 receives the end notification for the pre-process supporting program 421. When it is determined that the end notification is not received (S107: NO), the OS 21 awaits until the end notification is received.

When it is determined that the end notification is received (S107: YES), the OS 21 generates the print data with use of the general-use printing program implemented in the OS 21 (S108, arrow H in FIG. 3). The process in S108 is the same process as in S102. After the print data is generated, before transmitting the generated print data to the printer 2, the OS 21 outputs the execution command to the supporting program 42 corresponding to the printer 2 to start a process according to the post-process supporting program 422 (S109, arrow I in FIG. 3). The supporting program 42 executes the post-process according to the post-process supporting program 422.

Figure 7:
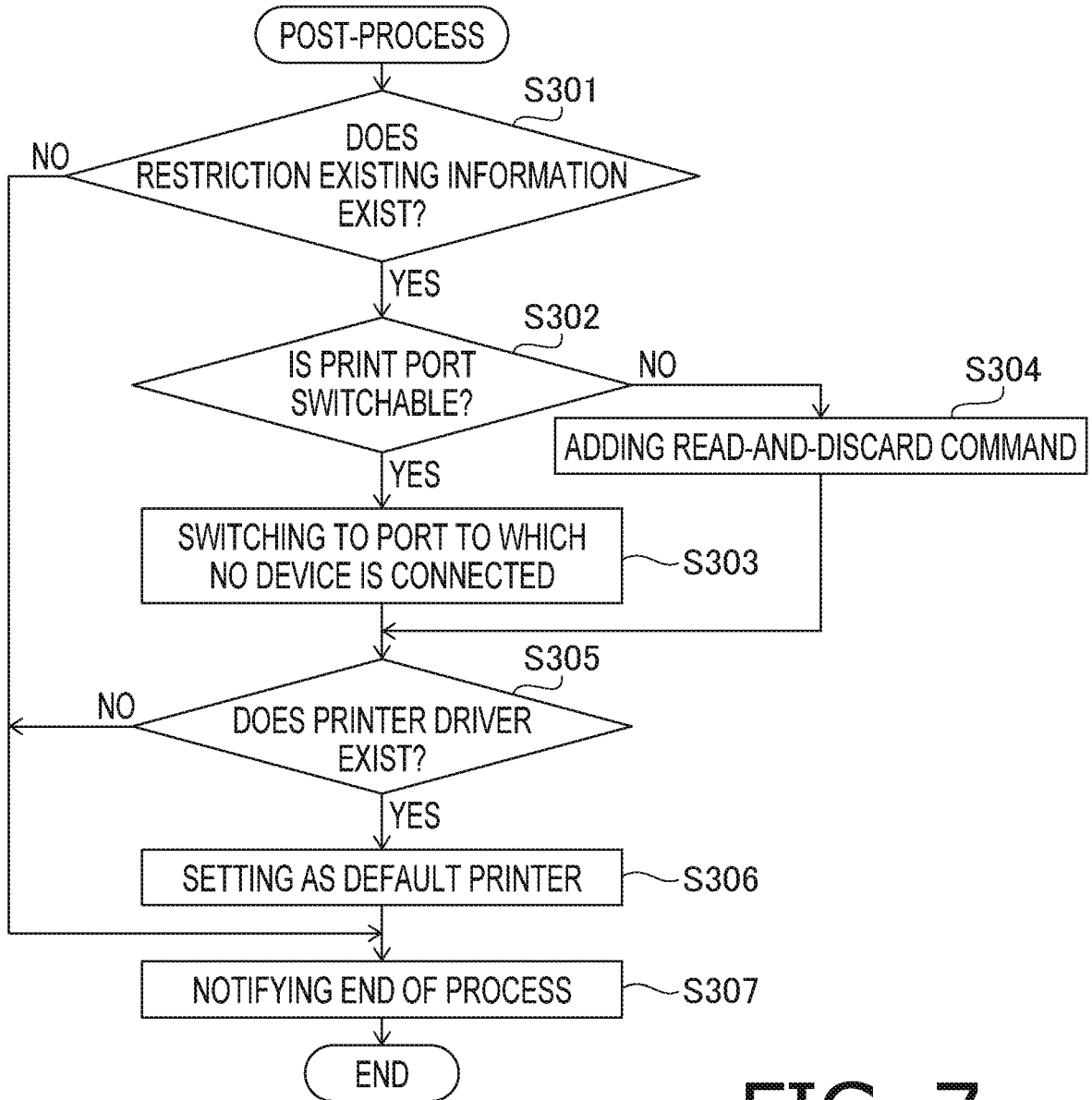
FIG. 7 is a flowchart illustrating a post-process.

A process of the post-process will be described referring to a flowchart shown in FIG. 7. In the post-process, the supporting program 42 determines whether the restriction existing information is added to the print parameter (S301, arrow J in FIG. 3). When it is determined that the restriction existing information is added (S301: YES), the supporting program 42 determines whether the print port can be switched (S302).

When it is determined that the print port can be switched (S302: YES), the supporting program 42 switches the output port of the present print job to a port to which no device is connected (S303, arrow K in FIG. 3). When it is determined that the print port cannot be switched (S302: NO), the supporting program 42 add a read-and-discard command instructing to read and discard the print data to the print parameter (S304). It is noted that the processed in S303 and S304 are examples of a restriction process.

When the printer 2 is compliant to the read-and-discard command, the printer 2 does not perform printing for the print job of which the print parameter includes the read-and-discard command, and merely discard the received print data. After discarding the print data, the printer 2 transmits an end signal to the PC 1.

When the output port of the print job is switched to the free port, the print data is not transmitted from the PC 1 to the printer 2. Thus, a communication load to the network and/or a processing load to the printer 2 is reduced and the printing process can be accelerated. On the other hand, when the printer 2 is caused to read and discard the printer data, as the printer 2 transmits the end signal to the OS 21, the PC 1 can normally finish the process.

After execution of S303 or S304, the supporting program 42 determines whether the printer driver of the printer 2 which is designated as the device to perform the present print job is implemented in the OS 21 (S305). The supporting program 42 determines, based on the model information of the printer 2, presence/absence of the printer driver corresponding to the model information.

When it is determined that the printer driver is installed in the PC 1 (S305: YES), the supporting program 42 set a printing method using the installed printer driver as a default printer (S306). The process in S306 is an example of a setting process.

After execution of S306, when it is determined that the restriction existing information is not added to the print parameter (S301: NO), or when it is determined that the printer driver of the printer 2 is not installed in the PC 1 (S305: NO), the supporting program 42 notifies the end of the post-process (S307, arrow L in FIG. 3) and terminates the post-process. The end notification is delivered from the post-process supporting program 422 to the OS 21.

Returning to the printing process shown in FIG. 5, the OS 21 determines whether the post-process supporting program 422 receives the end notification (S111). When the post-process is finished, the OS 21 receives the end notification from the post-process supporting program 422. When it is determined that the end notification has not been received (S111: NO), the OS 21 awaits until the end notification is received.

When it is determined that the end notification has been received (S111: YES), the OS 21 transmits the print data to the printer 2 (S103, arrow N in FIG. 3), and terminates the printing process. When the output port has been changed to the free port, the print data is not transmitted to any device. In such a case, the OS 21 determines, for example, that a communication error has occurred after a particular time period has elapsed. When the printer 2 has read and discarded the print data, the printer 2 does not perform printing.

It is noted that when the OS 21 is compliant to the cancel instruction, the supporting program 42 inputs the cancel instruction to the OS 21, instead of S209 of the pre-process (arrow E in FIG. 3). It is noted that input of the cancel instruction is also an example of the restriction process. In the printing process, after the OS 21 determines that the end notification has been received in S107, the OS cancel the remaining processes based on the cancel instruction (arrow E in FIG. 3). That is, the OS 21 does not generate the print data. When the OS 21 is compliant to the cancel instruction, if the supporting program 42 inputs the cancel instruction, the remaining processes are cancelled. Accordingly, the processing load to the OS 21 can be suppressed.

As described in detail, with the supporting program 42 according to the present embodiment, when there is a print instruction through the general-use printing program 41 which is standardly implemented in the OS 21, with respect to the printer subjected to the print instruction, printing by the printer is restricted as needed. Thus, even if the print instruction is received through the general-use printing program 41, unexpected printing can be restricted, and security of printing can be provided. It is noted that, among printer drivers, there are ones having a particular printing function instructing printing under particular conditions such as a mirror printing or a secure printing. When the general-use printing program 41 which is standardly implemented in the OS 21 is not compliant to printing according to the particular printing function, if the user change the printing route from the printer driver to the general-use printing program 41 standardly implemented in the OS 21, printing according to the particular printing function cannot be performed. According to the supporting program 42, printing according to the print instruction through the general-use printing program 41 standardly implemented with the OS 21 is restricted. Therefore, execution of the unexpected printing can be suppressed.

Further, according to the present embodiment, since the restriction condition for each user is determined based on the print parameter of the print job, not only printing is totally prohibited but restriction of printing depending on a condition can be performed.

According to the present embodiment, when the printer driver is installed, the printer through the printer driver is automatically set as the default printer. Accordingly, it may become possible that printing through the printer driver can be done on and after next printing.

If the restriction information 51 is stored in each printer, by managing presence/absence of the print restriction can be done on the printer side, which may save troublesome operations of the administrator of the print system. On the other hand, if the restriction information 51 is stored in the memory 12 of the PC 1, restriction of printing can be done for each user of the PC 1.

When printing is cancelled before the print data is generated with user of the general-use printing program 41, the printing process can be terminated at an early stage, and it is possible to eliminate waste of processing. On the other hand, if the print job is restricted after the print data is generated, since the process with use of the general-use printing program 41 has been finished, only a little influence is given to the process of the OS 21.

It is noted that the embodiment disclosed in the present specification is only an illustrative examples and is not intended to limit aspects of the present disclosures. Accordingly, the technique disclosed in the present specification can be modified or enhanced without departing from aspects of the disclosures. For example, the device connected to the PC 1 need not be limited to the printer, but any device which has a printing function (e.g., an MFP, a copier, a facsimile machine and the like). Further, the number of printer connected to the PC 1 need not be limited to one but any plural numbers of printers may be connected to the PC 1.

In the above-described embodiment, the supporting program 42 includes the pre-process and the post-process. However, according to aspects of the disclosures, the supporting program 42 may include only one of the pre-process and the post-process. That is, the supporting program 42 may include only the post-process supporting program 422 which is started after the print data is generated. In such a case, the post-process supporting program 422 may not determine presence/absence of the restriction existing information, but may retrieve the restriction information 51 and determine whether the restriction condition is satisfied. Further, the pre-process supporting program 421 and the post-process supporting program 422 may be different programs.

According to the present embodiment, the restriction condition is determined in the pre-process, while, in the post-process, whether printing is restricted or cancelled based on the restriction existing information. However, presence/absence of the restriction condition may be determined also in the post-process. For example, based on the data size of the print data, it is determined that printing is restricted for the print data of which size is larger than a particular size. For further example, regardless of the restriction condition, all the printing processes through the general-use printing program 41 may be prohibited.

In the present embodiment, when the restriction information 51 is not stored in the memory 12, the restriction information 51 stored in the printer is detected. It is noted that the detection may be performed in an opposite order, or the restriction information 51 stored in only one of the memory 12 and the printer may be detected. When the restriction information 51 is stored in the memory 12, the user of the PC 1 can easily set the restriction information 51. On the other hand, when the restriction information 51 is stored in the printer, the restriction condition can be set for each printer, which enables easy management of the administrator of the print system.

Further, in the post-process according to the present embodiment, when the print ports are switchable, switching of the print ports is performed. However, the read-and-discard command may be prioritized. That is, instead of determination in S302, the supporting program 42 may, for example, determine whether the printer is compliant to read-and-discard command based on the model information of the printer, and when it is determined that the printer is compliant thereto, the read-and-discard command may be added to the print parameter. Further, the supporting program 42 may rewrite the print data and delete the contents thereof. Further, in the post-process, switching of the print port or addition of the read-and-discard command is performed. However, the present embodiment need not be limited to such a configuration. The post-process is a program to perform only one of switching of the print port and addition of the read-and-discard command.

It is noted that a condition to restrict printing need not be limited to the configuration of the present embodiment. For example, instead of restricting printing per each user, printing may be restricted per a group of multiple users, or per each PC. Further, what is restricted may include unconditional prohibition of printing, restriction of a range of printing (e.g., prohibition of printing more than the restricted number, prohibition of color printing and the like), or prohibition of printing based on a particular condition (e.g., prohibition of printing during late at night, prohibition of printing by a guest user and the like).

In the post-process according to the present embodiment, when switching of the print port cannot be done (S302: NO), the read-and-discard command is added to the print parameter without any condition. However, the present embodiment need not be limited to such a configuration. That is, the supporting program 42 may determine whether the printer is compliant to the read-and-discard command before adding the read-and-discard command to the print parameter. For example, when determination at S302 is "NO," the supporting program 42 may determine, based on the model information of the printer, whether the printer is of a model which is compliant to the read-and-discard command, and add the read-and-discard command to the print parameter when it is determined that the printer is compliant to the read-and-discard command. When the printer is not compliant to the read-and-discard command, the supporting program 42 may terminate the printing process of the OS 21. For example, the supporting program 42 may cause the OS 21 to terminate the printing process by instructing an end of the printing process to the OS 21. It is noted that causing the OS 21 to terminate the printing process is also an example of the restriction process.

According to the present embodiment, in the post-process, switching of the print port (S303) or addition of the read-and-discard command (S304), and setting of a route of printing (i.e., setting of a default printer) (S306) are both performed. However, only one of them may be performed. Further, all of the process in S302-S306 and the process of causing the OS 21 to terminate the printing process are not necessary, but the supporting program 42 may have at least one of them.

When it is determined that the restriction condition is satisfied, the supporting program 42 may perform a process of installing a printer driver of the printer designated by the print instruction in the PC 1. For example, when decision at S305 of the post-process is "NO," the supporting program 42 may cause the PC 1 to download the installer of the printer driver. Further, the supporting program 42 may display a message recommending printing with use of the printer driver on the UI 20.

In the present embodiment, as an operation of the supporting program 42, only restriction of printing is described. However, the supporting program 42 may have further functions. When the supporting program 42 has further functions, the supporting program 42 may perform a process according to the further functions before S210 of the pre-process or before S307 of the post-process.

The module that performs the pre-process and the post-process need not be limited to the supporting program 42, but any program which is configured to receive instructions from the OS 21 when printing is performed with use of the general-use printing program 41 of the OS 21. For example, the module may be a Print workflow of which specification is published by Microsoft corporation.

According to the present embodiment, as the execution command of the supporting program 42 is output from the OS 21, the supporting program 42 is started up. However, the startup timing of the supporting program 42 need not be limited to such a timing. For example, the supporting program 42 may be a supporting program running all the time. In such a case, the supporting program 42 may perform the above-described operations in response to receipt of the execution command.

In any of the flowcharts disclosed in the embodiment, the order of multiple processes at arbitrary multiple steps may be changed arbitrarily or may be performed in parallel unless there occurs conflicts in processing contents. For example, the processes at S305-S306 of the post-process may be performed before S302-S304.

The processes disclosed in the present embodiment may be performed by a single CPU, a plurality of CPU's, hardware such as an ASIC or a combination thereof. Further, the processes disclosed in the present embodiment may be realized by various modes such as a non-transitory recording medium storing programs for performing the processes, methods for performing the processes and the like.

What is claimed is:

1. A non-transitory computer-readable recording medium for an information processing apparatus, an operating system being installed in the information processing apparatus and a general-use printing program being implemented in the operating system, the information processing apparatus having a controller, the recording medium containing computer-executable instructions comprising a supporting program corresponding to a printer connected to the information processing apparatus, the supporting program causing, when executed by the controller, the information processing apparatus to perform:
    when a print execution command corresponding to a print instruction is received through the operating system:
        determining whether a parameter contained in the print execution command satisfies a restriction condition;
    when the parameter contained in the print execution command satisfies the restriction condition, causing the operating system not to generate print data; and
    when the parameter contained in the print execution command does not satisfy the restriction condition, causing the operating system to generate print data based on the print instruction and transmit the print data to the printer.

2. The non-transitory computer-readable recording medium according to claim 1,
    wherein the printing based on the print instruction is restricted when a parameter of a print job corresponding to the print instruction satisfies the restriction condition, and the printing based on the print instruction is not restricted when the parameter does not satisfy the restriction condition.

3. The non-transitory computer-readable recording medium according to claim 2,
    wherein the restriction condition is set for a user of the print job.

4. The non-transitory computer-readable recording medium according to claim 3,
    wherein an allowed number of printable pages is set for each user, and the restriction condition is satisfied when a number of printing sheets indicated by the print job is more than the allowed number of printable pages set for the user of the print job.

5. The non-transitory computer-readable recording medium according to claim 3,
    wherein a printing parameter is restricted per each user, and the restriction condition is satisfied when the parameter of the print job includes the printing parameter restricted per the user of the print job.

6. The non-transitory computer-readable recording medium according to claim 1,
    wherein the information processing apparatus has a memory storing model information indicating a model of the printer, and
    wherein, when the print instruction to cause the printer to perform printing is received through the printing program, and a printer driver corresponding to the model indicated by the model information stored in the memory has been implemented in the operating system, the supporting program causes, when executed by the controller, the information processing apparatus to set, as a default printer, the printer through which printing is executed using the printer driver.

7. The non-transitory computer-readable recording medium according to claim 1,
    wherein the information processing apparatus has a memory storing access information used for accessing the printer,
    wherein the supporting program causes, when executed by the controller, the information processing apparatus to perform:
        obtaining the access information stored in the memory when the print instruction to cause the printer to perform printing is received; and
        accessing the printer through a communication interface of the information processing apparatus using the access information obtained from the memory and obtaining restriction information from the printer, and
    wherein the supporting program causes, when executed by the controller, the information processing apparatus to perform the cancelling printing when the restriction information obtained from the printer indicates that printing is to be restricted, and not perform the cancelling printing when the restriction information obtained from the printer indicates that the printing is not to be restricted.

8. The non-transitory computer-readable recording medium according to claim 1,
    wherein the information processing apparatus has a memory storing restriction information,
    wherein the supporting program causes, when executed by the controller, the information processing apparatus to obtain the restriction information stored in the memory when the print instruction to cause the printer to perform printing is received through the printing program, and
    wherein the supporting program causes, when executed by the controller, the information processing apparatus to perform the cancelling printing when the restriction information obtained from the memory indicates that the printing is to be restricted, and not perform the cancelling printing when the restriction information obtained from the memory indicates that the printing is not to be restricted.

9. The non-transitory computer-readable recording medium according to claim 1,
wherein the printing based on the print instruction is restricted before the operating system completes generation of print data by the printing program.

10. The non-transitory computer-readable recording medium according to claim 9,
wherein the printing based on the print instruction is restricted in response to a cancel instruction to cancel the printing based on the print instruction being input.

11. The non-transitory computer-readable recording medium according to claim 1,
wherein the printing based on the print instruction is restricted after the operating system completes generation of print data by the printing program.

12. The non-transitory computer-readable recording medium according to claim 11,
wherein the printing based on the print instruction is restricted by the controller obtaining print data generated by the operating system using the printing program and by not transmitting the obtained print data to the printer.

13. The non-transitory computer-readable recording medium according to claim 11,
wherein the printing based on the print instruction is restricted by the controller outputting, through a communication interface of the information processing apparatus, a command to cause the printer to perform a -read-and-discard operation of discarding received print data without printing.

14. The non-transitory computer-readable recording medium according to claim 1,
wherein, when the instructions comprise an other supporting program corresponding to an other printer different from the printer, the other supporting program can be implemented in the operating system, and when the information processing apparatus has a memory storing identification information identifying a supporting program and printer information identifying a printer supported by corresponding supporting program in association with each other for each supporting program implemented in the operating system, the operating system executes a process of a supporting program indicated by the identification information associated with the printer information of the printer subjected to the print instruction.

15. The non-transitory computer-readable recording medium according to claim 1,
wherein, when the operating system detects the print instruction to cause the printer to perform printing through the printing program, and when the operating system outputs a detection notification to notify that the print instruction is detected after detecting the print instruction and before start of generation of print data corresponding to the print instruction, the supporting program causes, when executed by the controller, the information processing apparatus to determine whether the parameter contained in the print execution command satisfies the restriction condition in response to output of the detection notification.

16. The non-transitory computer-readable recording medium according to claim 1, wherein, when the print instruction satisfies the restriction condition, causing the operating system not to generate print data comprises causing the operating system to cancel printing according to the print data.

17. The non-transitory computer-readable recording medium according to claim 1, wherein, when the print instruction satisfies the restriction condition, causing the operating system not to generate print data comprises allowing the general-use printing program to generate the print data, switching a printing port from a particular port through which the print data is to be transmitted to the printer to an unconnected port to which the printer is not connected, and causing the operating system to output the print data through the unconnected port.

18. The non-transitory computer-readable recording medium according to claim 1, wherein, when the print instruction satisfies the restriction condition, causing the operating system not to generate print data comprises allowing the general-use printing program to generate the print data, adding a read-and-discard command to the print data, and causing the operating system to transmit the print data to the printer.

19. An information processing apparatus comprising:
a controller,
a supporting program corresponding to a printer connected to the information processing apparatus;
an operating system;
a printing program implemented in the operating system; and
a general-use printing program implemented in the operating system;
wherein when a print execution command corresponding to a print instruction is received through the operating system, the controller performs determining whether a parameter contained in the print execution command satisfies a restriction condition,
when the parameter contained in the print execution command satisfies the restriction condition, causing the operating system not to generate print data, and
when the parameter contained in the print execution command does not satisfy the restriction condition, causing the operating system to generate print data based on the print instruction and transmit the print data to the printer.

20. A printing method of controlling an information processing apparatus having an operating system, a printing program implemented in the operating system and a general-use printing program implemented in the operating system, the method comprising:
when a print execution command corresponding to a print instruction is received through the operating system, performing determining whether a parameter contained in the print execution command satisfies a restriction condition,
when the parameter contained in the print execution command satisfies the restriction condition, causing the operating system not to generate print data, and
when the parameter contained in the print execution command does not satisfy the restriction condition, causing the operating system to generate print data based on the print instruction and transmit the print data to the printer.

* * * * *